Feb. 6, 1968  L. CHINAGLIA  3,367,839
CLOSED CYCLE NUCLEAR REACTOR
Filed July 12, 1965  4 Sheets-Sheet 1

United States Patent Office 3,367,839
Patented Feb. 6, 1968

3,367,839
CLOSED CYCLE NUCLEAR REACTOR
Leopoldo Chinaglia, Turin, Italy, assignor to Fiat Società per Azioni, Turin, Italy
Filed July 12, 1965, Ser. No. 471,230
Claims priority, application Italy, July 17, 1964, 16,334/64
4 Claims. (Cl. 176—65)

This invention relates to closed cycle nuclear reactors for generating steam, comprising a reactor core enclosed in a vessel, reactor control devices, coolant circulating pumps and circuits and heat exchangers all enclosed in a plant container.

Around the reactor vessel a primary shield is arranged to attenuate the radiation emitted by the reactor, and a secondary shield is placed externally on the walls of the plant container to reduce to predetermined levels the radiation emitted from the whole plant.

The reactor and components of the coolant circuit are interconnected by large diameter pipes which, in order to withstand the stresses due to thermal expansion, are rather cumbersome in lay-out.

Consequently, the plant container is of a large size and the secondary shield is of considerable weight.

This invention obviates the above drawbacks and provides a highly compact closed-cycle nuclear reactor, which for an equal energy output is smaller and is lighter than the theretofore known compact reactors.

More specifically this invention provides a closed-cycle nuclear reactor of the type comprising a reactor vessel and heat exchangers interconnected by pipes for circulating a coolant, wherein the heat exchangers are arranged closely adjacent to the reactor vessel, the reactor vessel and heat exchangers are surrounded by a plant container, and means are provided for rigidly connecting portions of the wall of the reactor vessel to facing portions of the wall of each heat exchanger, these means being situated in proximity to portions of the walls of the reactor vessel and of each heat exchanger which present the apertures for coolant circulating pipes.

Preferred embodiments of this invention will now be described by way of example with reference to the accompanying drawings, in which.

Figure 1:
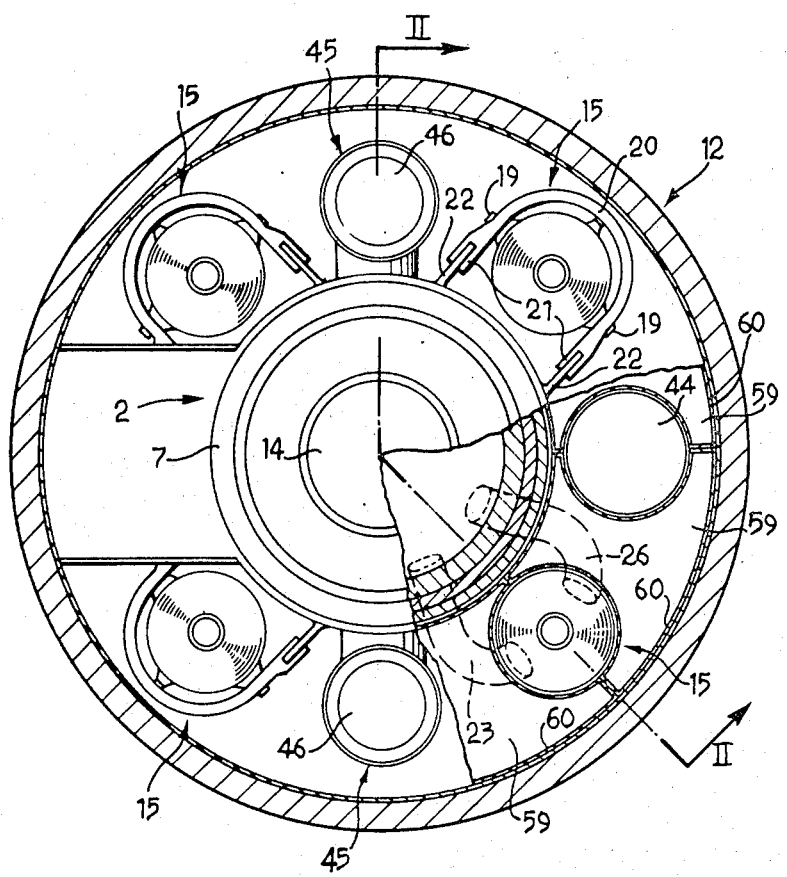
FIGURE 1 is a diagrammatical plan view and part cross-sectional view of a reactor according to this invention.

The reactor shown in the drawing is a pressurized water reactor having a core 1 enclosed in a reactor vessel 2 having a cylindrical body 3 with a vertically disposed main axis. The bottom end of the body 3 is closed by a semispherical dished end cap 4, while the top end of the body 3 of the reactor vessel presents a flange 5 for a semispherical end cap 6 pressed against the flange 5 by means of a ring flange 7.

The reactor vessel 2 is supported by means of a plurality of radially extending brackets 8 fixed to the body 3 around its lower end and bearing on a ring-like supporting beam 9, fixed to the reactor supporting structure 10, covered by a floor plate 11, which as in the embodiment shown is sealed to an intermediate portion of wall of the bottom cap 4.

The reactor vessel 2 is wrapped in a thermal insulation 12, which in turn is covered by a lead mantle 13, forming the primary shield.

Above the reactor vessel are situated control rod driving mechanisms 14.

Around and close to the reactor vessel there are four circumferentially spaced vertical heat exchangers 15 each having a tubular body 16 wrapped in a thermal insulation and extending parallel to the reactor vessel 2.

Each heat exchanger is supported by one bracket 17 radially extending out of the bottom portion of the exchanger body 16, and bearing on the ring beam 9 in an abutting relationship with one of the vessel brackets 8, to which the heat exchanger bracket 17 is rigidly connected by means of a bolted connection, represented by a bolt 18.

The upper portion of each exchanger 15 presents two diametrally opposite trunnions 19, pivotally engaged in a yoke 20, the end portions of which are connected by means of hinges 21 to cleats 22 conveniently fixed to the vessel flange 5.

A U bent pipe 23 conveys the coolant heated in the core 1 and passing through a space 24 formed between the cap 4 and a baffle 25 into each heat exchanger 15, while a similar pipe 26 passing through the wall of the cap 4 and terminating in an opening 27 in the baffle 25, conveys the coolant from the heat exchanger into a space 28 formed between the baffle 27 and a baffle 29, separating the core from the space 28. The steam leaves the heat exchanger through a pipe 30. The openings in the wall of the reactor vessel and of the heat exchanger to which the end portions of the pipes 23, 26 are connected, are situated in proximity to the brackets 8, 17 respectively.

When the reactor vessel 3 and the heat exchanger 15 expand, brackets 8 and 17 push against each other and slide on the ring beam 9. Should the expansion of the flange 5 be different from that of the lower portion of the vessel body 3, the heat exchanger is free to incline relatively of the reactor vessel by virtue of the articulations 19, 21 of the yoke 20.

Upon contraction of the reactor vessel 2, the bracket 8 pulls the bracket 17 and pulls the heat exchanger 15, so that there is practically no relative movement between the portions of the reactor vessel body and the heat exchanger body to which the brackets 8 and 17 are attached.

Thus, the stresses to which the connecting pipes 23, 26 are subjected due to thermal deformations are greatly reduced and are caused by their own thermal expansion, by inclining of the heat exchanger relatively to the reactor vessel, and by the fact that the positions of both vessels to which the pipes 23, 26 are connected may expand differently from the portions to which the brackets 8, 17 are fixed. However, because the brackets 8, 17 situated close to the openings or nozzles to which the pipes 23, 26 are fixed, the last mentioned difference in thermal expansion of relative portions of the walls of the reactor vessel and of the heat exchanger are small.

Consequently, the pipes 23, 26 can be of short length and can be easily accommodated in restricted space available in a compact reactor.

Figure 4:
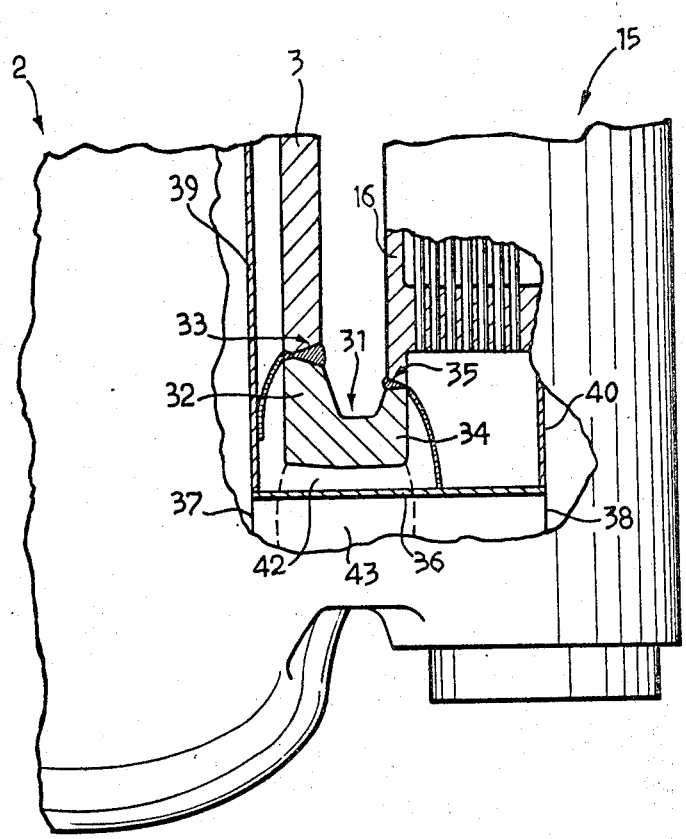
FIGURE 4 is a part sectional side view showing an alternative embodiment of the particular portion shown in FIGURE 3.

An alternative way of mechanically fixing and hydraulically connecting a heat exchanger to the reactor vessel is shown in FIGURE 4. Here a flanged tubular connecting piece 31 has one flange 32 fitted into an opening 33 in the wall of the body 3 of the reactor vessel 2, the opposite flange 34 of the connecting piece 31 is fitted to a corresponding opening 35 in the wall of the body 16 of the heat exchanger 15. Both flanges are welded to respective walls to offer a rigid connection supporting the weight of the heat exchanger directly of the reactor vessel.

A tube 36, having its ends welded to the edges of openings 37, 38 in baffles 39, 40 of the reactor vessel and heat exchanger is arranged internally of the connecting piece 31 to form two separate passages 42, 43 for the circulation of coolant between the reactor vessel and each heat exchanger.

As shown in FIG. 1 in the spaces between adjacent heat exchangers 15 are arranged a pressurizer 44 and two coolant circulating pumps 45, each driven by an electric motor 46, situated above the level of the reactor vessel flange 5.

The pressurizer 44 is connected to the reactor vessel by means of a small diameter and therefore flexible pipe (not shown) and can be therefore fixed to the reactor vessel in any conventional way.

Each pump 45 and motor 46 are fixed to one end of a pipe 47 communicating with the delivery side of the pump. The other end of the pipe 47 passes through an opening in the wall of the body 3 of the reactor vessel and terminates in an opening in the baffle 25. The pipe is welded to the wall of the body 3 and to the baffle 25, so that it is sealed from the space 24, and communicates with an annular channel 48 formed within the reactor vessel and leading to the reactor core. The pipe 47 and pump 45 are heat insulated. Within the pipe 47, is concentrically arranged a smaller diameter pipe 49, communicating at one end with the suction side of the pump 45 and having the other end sealed from the channel 48 and opened to the space 28, collecting coolant discharged from the heat exchangers.

The reactor vessel 2, the heat exchangers 15, the pressurizer 44 and the pumps 45 are surrounded by a cylindrical body 50 of a plant container 51, closed at its bottom end by the floor 11 and by a dished end portion 52, the top of the container 51 presenting a roof portion 53 having a large opening for inspection purposes and closed by means of a dished cover 54, fixed by means of flanges 55, whereby the plant container forms a tight enclosure around the reactor vessel, heat exchangers and pumps.

On the cylindrical body 50, roof portion 53 and cover 54 of the plant container 51, is applied externally a secondary shield 56, 57, 58 respectively.

It is already known to improve the attenuating factor of the primary shield disposed around the reactor vessel and comprising the mantles of thermal insulation 12 and lead 13, by surrounding the lead mantle by a water jacket of suitable thickness, say 36 inches. However, such an arrangement necessitates placing the heat exchangers and pumps further away from the reactor vessel, and consequently the plant container and the secondary shield result large and heavy.

Figure 2:
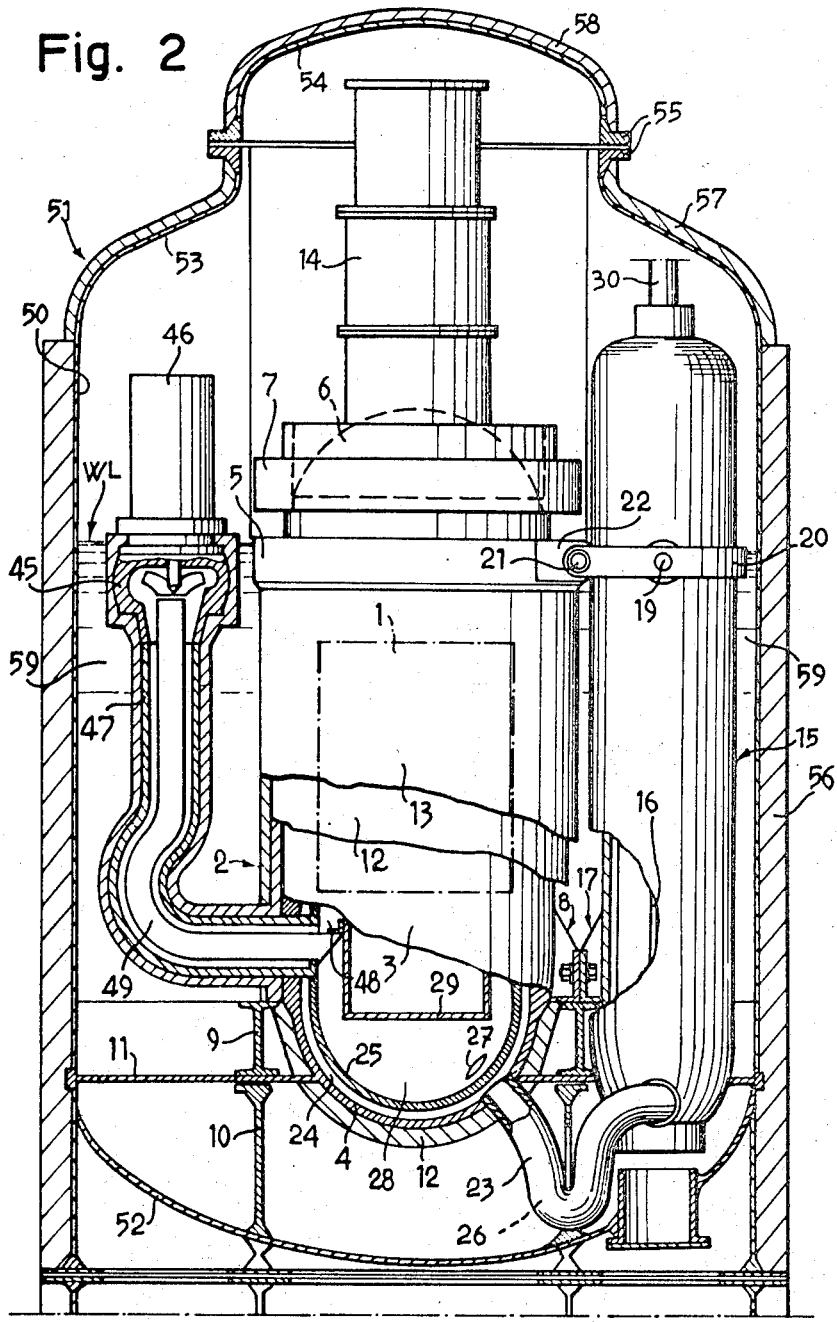
FIGURE 2 is an axial part sectional view on line II—II of FIGURE 1.
Figure 3:
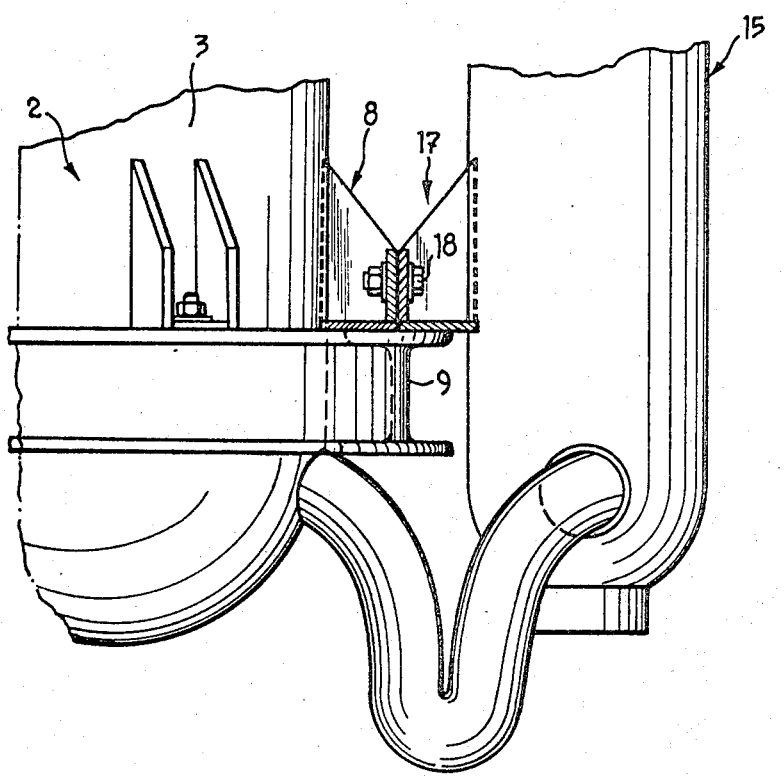
FIGURE 3 is a part sectional side view in an enlarged scale showing a particular portion of FIGURE 2.

According to the invention there is proposed to fill the free space 59 above the floor 11 and between the reactor vessel 2 and plant container 51 with water reaching up to the level indicated by reference WL on FIG. 2, i.e. up to the level of the vessel flange 5, so that a substantial portion of each heat exchanger 15, the pumps 45 and the pipes 47 are immersed in water, whereby the attenuating factor of the reactor shielding is improved, without having to increase the size of the plant container 51 and the weight of the secondary shield 56, 57. Of course, the heat insulation of the heat exchangers 15 and coolant circulating pumps 45 and pipes 47 is protected by suitable jackets (not shown) such as of stainless steel sheet, or as shown in FIG. 1, the water is contained in tubular cans 60 of a cross-section corresponding to the cross-section of the sectors of the free space 59, comprised between each heat exchanger and the adjacent pump or pressurizer.

While the embodiments of the present invention as herein disclosed constitute preferred forms, it is to be understood that other forms might be adopted without departing from the scope of the invention as defined in the appended claims.

What I claim is:

1. A closed cycle compact pressurized water nuclear reactor comprising; a core, a cylindrical vertically positioned body surrounding the core, caps closing the upper and lower end of the cylindrical body and defining with the latter a pressure resistant reactor vessel, a number of tubular bodies, each body enclosing a heat exchanger, the tubular bodies positioned around and close to the exterior sides of the cylindrical body of the reactor vessel and extending parallel thereto, pipes extending from the reactor vessel to each of the heat exchangers for circulating a coolant medium between the reactor vessel and each of the heat exchangers, the pipes extending from apertures in the lower portion of the reactor vessel to apertures in the tubular bodies enclosing the heat exchangers, a plant container surrounding both the reactor vessel and the heat exchangers, pumps connected for circulating the coolant medium between the reactor vessels and heat exchangers, means for pivotally connecting an upper portion of each tubular body enclosing a heat exchanger to the cylindrical body enclosing the core, and means for rigidly connecting each of the tubular bodies to the cylindrical body near their lower end portions, the means for rigidly connecting the bodies being positioned in proximity to the portions of the bodies in which the apertures are formed for connecting the coolant medium circulating pipes.

2. A closed cycle compact pressurized water nuclear reactor as defined in claim 1 wherein the means for rigidly connecting the bodies near their lower end portions comprises at least one bracket fixed to the body of the reactor vessel, and a bracket fixed to each of the tubular bodies enclosing the heat exchangers, the respective brackets fixed to the tubular bodies enclosing the heat exchangers being rigidly connected to the bracket fixed to the body of the reactor vessel.

3. A closed cycle compact pressurized water nuclear reactor as defined in claim 1 wherein free space exists between the reactor vessel, the plant container, the tubular bodies enclosing heat exchangers, the pumps and pipes, and this free space is filled with water up to a level above the core enclosed in the reactor vessel.

4. A closed cycle compact pressurized water nuclear reactor as defined in claim 3 comprising a plurality of tubular cans filled with water and having a cross section corresponding to the cross section of free sectors defined by the outside surface of the reactor vessel, inside surface of the plant container, and facing surfaces of the tubular bodies enclosing the heat exchangers, pumps and pipes housed in the free space.

References Cited

UNITED STATES PATENTS

| 2,810,689 | 10/1957 | Wigner et al. | 176—65 |
| 3,151,034 | 9/1964 | Douglass et al. | 176—65 |
| 3,185,631 | 5/1965 | Long et al. | 176—65 |
| 3,192,121 | 6/1965 | Challender | 176—60 |

FOREIGN PATENTS

| 1,264,202 | 5/1961 | France. |
| 912,208 | 12/1962 | Great Britain. |

OTHER REFERENCES

Lawrence, German application 1,178,955, printed October 1964 (KL 21G–21/24), 3 pp. Spec., 3 shts. Dwg.

L. DEWAYNE RUTLEDGE, *Primary Examiner.*